United States Patent
Mashimo et al.

(10) Patent No.: US 12,195,034 B2
(45) Date of Patent: Jan. 14, 2025

(54) ELECTRONIC CONTROL DEVICE, CONTROL METHOD, AND AUTOMATIC DRIVING SYSTEM

(71) Applicant: HITACHI ASTEMO, LTD., Hitachinaka (JP)

(72) Inventors: Daisuke Mashimo, Tokyo (JP); Akihiko Sato, Hitachinaka (JP); Keisuke Ampo, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 379 days.

(21) Appl. No.: 17/615,964

(22) PCT Filed: Jun. 1, 2020

(86) PCT No.: PCT/JP2020/021527
§ 371 (c)(1),
(2) Date: Dec. 2, 2021

(87) PCT Pub. No.: WO2020/246411
PCT Pub. Date: Dec. 10, 2020

(65) Prior Publication Data
US 2022/0324478 A1    Oct. 13, 2022

(30) Foreign Application Priority Data
Jun. 5, 2019 (JP) .................. 2019-105637

(51) Int. Cl.
*B60W 60/00* (2020.01)
*G01C 21/00* (2006.01)
*H04W 4/40* (2018.01)

(52) U.S. Cl.
CPC ........ *B60W 60/001* (2020.02); *G01C 21/3815* (2020.08); *G01C 21/387* (2020.08);
(Continued)

(58) Field of Classification Search
CPC .......... B60W 60/001; B60W 2556/40; B60W 2556/50; B60W 30/182; B60W 30/10;
(Continued)

(56) References Cited

U.S. PATENT DOCUMENTS

| | | | | |
|---|---|---|---|---|
| 2001/0002456 A1* | 5/2001 | Ikeuchi | ............... | G01C 21/387 701/461 |
| 2008/0109528 A1* | 5/2008 | Knight | ..................... | G06F 8/71 709/217 |

(Continued)

FOREIGN PATENT DOCUMENTS

| | | |
|---|---|---|
| JP | 2018-207154 A | 12/2018 |
| JP | 2019-77427 A | 5/2019 |

(Continued)

OTHER PUBLICATIONS

International Search Report, PCT/JP2020/021527, Aug. 25, 2020.

*Primary Examiner* — Jess Whittington
*Assistant Examiner* — Shahira Baajour
(74) *Attorney, Agent, or Firm* — Volpe Koenig

(57) ABSTRACT

An electronic control device is mounted on a vehicle and executes automatic driving control using a plurality of pieces of map information. Each piece of the map information includes one or more pieces of partial data corresponding to a predetermined geographical area and being information of a predetermined attribute related to a road of the predetermined geographical area. The electronic control device includes a storage unit that stores one or more pieces of the map information, a specification unit that specifies the map information corresponding to a traveling position of the vehicle, and a control unit that determines a control method of the vehicle at a traveling position of the vehicle according to the partial data included in the map information specified by the specification unit.

9 Claims, 8 Drawing Sheets

(52) U.S. Cl.
CPC .......... *G01C 21/3896* (2020.08); *H04W 4/40* (2018.02); *B60W 2556/40* (2020.02); *B60W 2556/50* (2020.02)

(58) Field of Classification Search
CPC ......... B60W 50/00; B60W 2050/0002; B60W 2050/0043; G01C 21/3815; G01C 21/387; G01C 21/3896; G01C 21/3889; G01C 21/26; H04W 4/40; H04W 4/44; H04W 4/021; G08G 1/00; G08G 1/137
See application file for complete search history.

(56) References Cited

U.S. PATENT DOCUMENTS

| | | | |
|---|---|---|---|
| 2010/0070162 A1* | 3/2010 | Aihara | G08G 1/005 |
| | | | 701/533 |
| 2012/0092990 A1* | 4/2012 | Tapia | H04M 3/2227 |
| | | | 370/232 |
| 2016/0245953 A1* | 8/2016 | Al-Nahdi | E21B 47/06 |
| 2017/0150371 A1* | 5/2017 | Cichonski | H04W 64/00 |
| 2020/0249050 A1 | 8/2020 | Kato et al. | |
| 2020/0378788 A1* | 12/2020 | Fujita | G08G 1/13 |
| 2021/0014643 A1 | 1/2021 | Kuroda et al. | |
| 2021/0223061 A1* | 7/2021 | Hosoi | G08G 1/0141 |

FOREIGN PATENT DOCUMENTS

| | | |
|---|---|---|
| WO | 2018/211638 A1 | 11/2018 |
| WO | 2018/221454 A1 | 12/2018 |
| WO | 2018/229872 A1 | 12/2018 |

* cited by examiner

FIG. 4

| CONTENT LEVEL | CONTROL POLICY ID | CONTROL POLICY |
|---|---|---|
| L1 | 1 | LANE TRACKING TRAVEL (MAXIMUM SPEED: 60km/h) |
| L2 | 2 | LANE TRACKING TRAVEL (MAXIMUM SPEED: 80km/h) |
| L3 | 3 | MULTIPLE LANE TRAVEL (MAXIMUM SPEED: 100km/h) |

FIG. 5

| CONTENT LEVEL | CONTENT ID |
|---|---|
| L1 | M |
| L2 | N, O |
| L3 | P, Q |

FIG. 9A

| AREA ID | CONTENT LEVEL |
|---------|---------------|
| B | L1 |
| B | L2 |
| B | L3 |
| C | L1 |
| C | L2 |
| C | L3 |

| AREA ID | CONTENT LEVEL |
|---------|---------------|
| C | L1 |
| D | L1 |
| C | L2 |
| D | L2 |
| C | L3 |
| D | L3 |

| AREA ID | CONTENT LEVEL |
|---------|---------------|
| D | L1 |
| D | L2 |
| D | L3 |
| E | L1 |
| E | L2 |
| E | L3 |

600c

ELECTRONIC CONTROL DEVICE, CONTROL METHOD, AND AUTOMATIC DRIVING SYSTEM

TECHNICAL FIELD

The present invention relates to an electronic control device, a control method, and an automatic driving system.

BACKGROUND ART

In recent years, expectations for automatic driving vehicles have increased in order to realize a safe and secure transportation society, and technological development has been advanced in various countries around the world. The automatic driving vehicle realizes automatic driving travel by recognizing a surrounding situation in real time using sensor information such as a camera or a radar mounted on the vehicle, for example. In addition, highly accurate map information is used for the purpose of complementing recognition processing based on sensor information in such automatic driving travel. The map information includes, for example, content such as center line information and gradient information in units of lanes on which the vehicle travels, and feature information such as signs and signals, and is used for providing information that cannot be acquired by the sensor and improving the accuracy of the information acquired by the sensor, and plays a major role in improving the continuity and stability of the automatic driving function.

PTL 1 discloses a vehicle control device configured to control a travel state of a vehicle, the vehicle control device including: a travel control unit configured to set control contents for automatic driving of the vehicle and control the vehicle according to the control contents; a notification output unit configured to perform an output for notifying a driver of the vehicle of the control contents; a response reception unit configured to receive a response of the driver to the notification; and a selection setting unit configured to select and set whether to cause the travel control unit to continue the control contents or cause the travel control unit to set other control contents according to the response.

CITATION LIST

Patent Literature

PTL 1: JP 2019-77427 A

SUMMARY OF INVENTION

Technical Problem

The invention described in Patent Literature 1 does not describe processing in a case where information regarding a road is insufficient, and there is room for improvement.

Solution to Problem

An electronic control device according to a first aspect of the present invention is an electronic control device that is mounted on a vehicle and executes automatic driving control using a plurality of pieces of map information. Each piece of the map information includes one or more pieces of partial data corresponding to a predetermined geographical area and being information of a predetermined attribute related to a road of the predetermined geographical area. The electronic control device includes: a storage unit that stores one or more pieces of the map information; a specification unit that specifies the map information corresponding to a traveling position of the vehicle; and a control unit that determines a control method of the vehicle at a traveling position of the vehicle according to the partial data included in the map information specified by the specification unit.

A control method according to a second aspect of the present invention is a control method executed by an electronic control device that is mounted on a vehicle and executes automatic driving control using a plurality of pieces of map information. Each piece of the map information includes one or more pieces of partial data corresponding to a predetermined geographical area and being information of a predetermined attribute related to a road of the predetermined geographical area. The electronic control device includes a storage unit in which one or more pieces of the map information are stored. The control method includes: specifying the map information corresponding to a traveling position of the vehicle; and determining a control method of the vehicle at a traveling position of the vehicle according to the partial data included in the specified map information.

An automatic driving system according to a third aspect of the present invention is an automatic driving system including: an electronic control device that is mounted on a vehicle and executes automatic driving control using a plurality of pieces of map information; and a server that communicates with the electronic control device via wireless communication. Each piece of the map information includes one or more pieces of partial data corresponding to a predetermined geographical area and being information of a predetermined attribute related to a road of the predetermined geographical area. The electronic control device includes: an in-vehicle communication unit that transmits, to the server, a travel route that is information on a route on which the vehicle will travel from now on, and receives map distribution plan information that is information on the partial data related to the travel route; a storage unit that stores one or more pieces of the map information; a map acquisition execution unit that acquires the partial data from outside the vehicle based on the map distribution plan information and stores the partial data in the storage unit; a specification unit that specifies the map information corresponding to a traveling position of the vehicle; and a control unit that determines a control method of the vehicle at a traveling position of the vehicle according to the partial data included in the map information specified by the specification unit. The server includes: a map information database that includes a data size of information of a predetermined attribute regarding the road for each of the geographical areas and information of a route for each of the geographical areas; and a map distribution planning unit that creates the map distribution plan information based on the travel route received from the electronic control device and the map information database.

Advantageous Effects of Invention

According to the present invention, even when there is a lack of information regarding a road in an area where a vehicle travels, automatic driving according to the held information can be executed. Objects, configurations, and effects described above will be apparent through the explanation on the following embodiments.

BRIEF DESCRIPTION OF DRAWINGS

FIG. 4 is a diagram illustrating an example of a control policy table.

FIG. 5 is a diagram illustrating an example of a content level correspondence table.

FIGS. 9A to 9C is a diagram illustrating an operation example.

DESCRIPTION OF EMBODIMENTS

First Embodiment

A first embodiment of an automatic driving system according to the invention will be described below with reference to FIGS. 1 to 9A to 9C.

Figure 1:
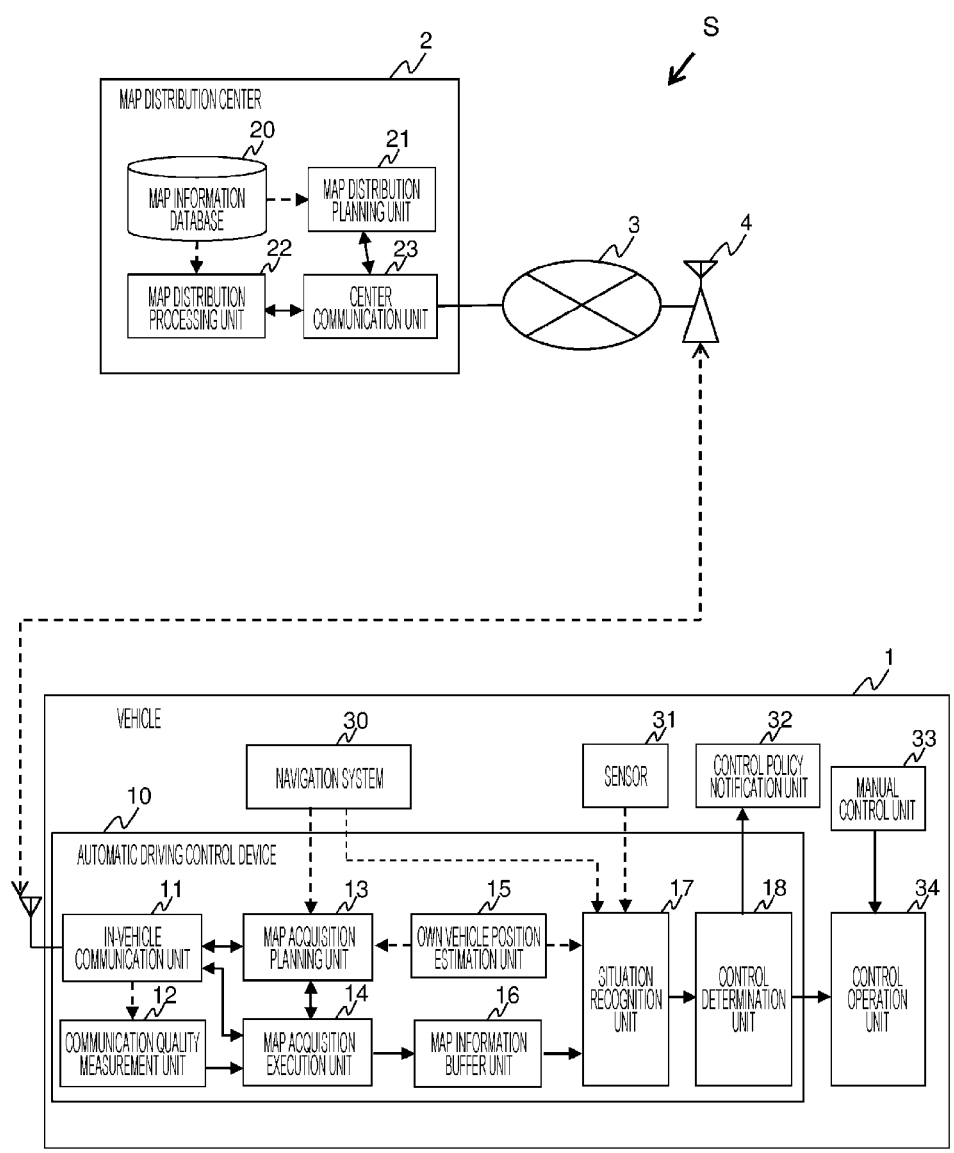
FIG. 1 is a configuration diagram of an automatic driving system according to a first embodiment.

FIG. 1 is a configuration diagram of an automatic driving system S. The automatic driving system S includes a map distribution center 2 and one or more vehicles 1. The vehicle 1 is connected to the map distribution center 2 via a wireless base station 4 and a network 3. The vehicle 1 performs automatic driving travel while acquiring map information from the map distribution center 2. That is, the vehicle 1 is an automatic driving vehicle.

The vehicle 1 includes an automatic driving control device 10, a navigation device 30, a sensor 31, a control policy notification unit 32, a manual control unit 33, and a control operation unit 34. The automatic driving control device 10 includes an in-vehicle communication unit 11, a communication quality measurement unit 12, a map acquisition planning unit 13, a map acquisition execution unit 14, an own vehicle position estimation unit 15, a map information buffer unit 16, a situation recognition unit 17, and a control determination unit 18.

The communication quality measurement unit 12, the map acquisition planning unit 13, the map acquisition execution unit 14, the own vehicle position estimation unit 15, the map information buffer unit 16, the situation recognition unit 17, and the control determination unit 18 are realized by a CPU which is a central processing unit, a ROM which is a read-only storage device, and a RAM which is a readable/writable storage device. However, the CPU, the ROM, and the RAM are not illustrated in FIG. 1. Specifically, the CPU realizes these functions by developing a program stored in the ROM into the RAM and executing the program. However, all or a part of the communication quality measurement unit 12 and the like may be realized by FPGA (Field Programmable Gate Array), which is a rewritable logic circuit instead of the combination of a CPU, a ROM, and a RAM, or ASIC (Application Specific Integrated Circuit) which is an integrated circuit for specific applications. Further, the communication quality measurement unit 12 and the like may be realized by a combination of different configurations, for example, a combination of a CPU, a ROM, and an FPGA, instead of the combination of a CPU, a ROM, and a RAM.

The in-vehicle communication unit 11 is, for example, a wireless communication module having a wireless interface for connection with the wireless base station 4. The in-vehicle communication unit 11 processes a communication protocol and transmits and receives data to and from the map distribution center 2.

The communication quality measurement unit 12 periodically measures the communication quality of the wireless interface included in the in-vehicle communication unit 11, and notifies the map acquisition execution unit 14 of communication quality information. The communication quality measured by the communication quality measurement unit 12 is, for example, a signal to noise ratio (SNR) of a radio signal. The map acquisition execution unit 14 classifies the value of the measured communication quality into, for example, high, medium, low, and impossible, and notifies the corresponding classification as the communication quality information. The case of impossible indicates that the content cannot be acquired. For example, the communication quality information may be notified every time the communication quality information is periodically measured, or may be notified only when the classification of the communication quality changes.

The map acquisition planning unit 13 receives travel route information from the navigation device 30 and notifies the map distribution center 2 of the received travel route information. Then, the map acquisition planning unit 13 acquires map distribution plan information 100 to be described next from the map distribution center 2.

(Map Distribution Plan Information 100)

Figure 2:
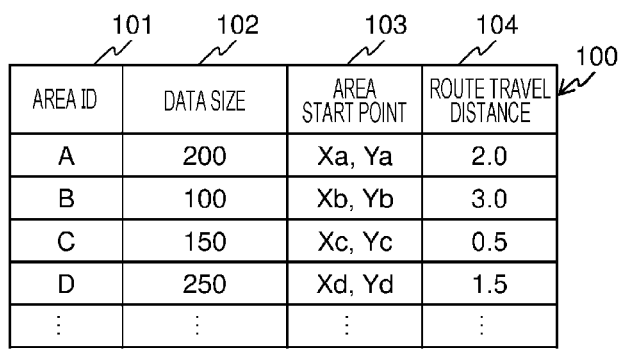
FIG. 2 is a diagram illustrating an example of map distribution plan information.

FIG. 2 is a diagram illustrating an example of the map distribution plan information 100. The map distribution plan information 100 includes an area ID 101, a data size 102, an area start point 103, and a route travel distance 104. The area ID 101 is an ID assigned to each geographical area, that is, each area, which is a management unit of map information stored in a map information database 20 of the map distribution center 2. The geographical area identified by the area ID 101 is, for example, a square area of 2 km square. However, the respective geographical areas only need to be identified, the areas of the respective geographical areas do not have to be the same, and the geographical areas may be divided according to, for example, address notation.

The data size 102 in FIG. 2 is a total data size of all contents acquired by the vehicle 1 in the map information of each area. The unit of the data size illustrated in FIG. 2 is, for example, kB (kilobyte). The content will be described later. The area start point 103 is position information indicating a point where entry to the area is started on the travel route. The format of the position information is irrelevant as long as the position can be specified, but for example, a combination of latitude and longitude can be used as the position information. The route travel distance 104 is a travel distance of the area on the travel route. The unit of the distance illustrated in FIG. 2 is, for example, km. In addition, each entry of the map distribution plan information 100 is configured to be in the passage order of the areas according to the travel route information.

Further, the map acquisition planning unit 13 notifies the map acquisition execution unit 14 of map acquisition scheduling information 200 when the automatic driving is started or when the vehicle 1 reaches the area start point 103 of the map distribution plan information 100. The map acquisition scheduling information 200 is information indicating an acquisition priority in units of content of the map information at the time of traveling in the area. The map acquisition planning unit 13 determines whether the vehicle 1 has reached the area start point 103 on the basis of own position information received from the own vehicle position estimation unit 15. The map acquisition scheduling information 200 is rewritten along with the movement of the vehicle 1.

(Map Acquisition Scheduling Information 200)

Figure 3:
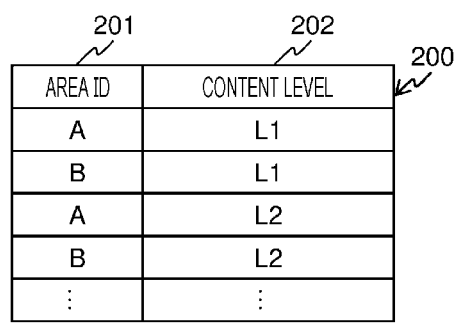
FIG. 3 is a diagram illustrating an example of map acquisition scheduling information.

FIG. 3 is a diagram illustrating an example of the map acquisition scheduling information 200. The map acquisition scheduling information 200 includes an area ID 201 and a content level 202. The area ID 201 is an ID assigned to each area that is a management unit of map information stored in the map information database 20 of the map distribution center 2. That is, the area ID 201 is the same type of information as the area ID 101 in the map distribution plan information 100. Hereinafter, in order to simplify the notation, the area having the area ID "A" is referred to as "area A".

The content level 202 is a value indicating the acquisition priority in units of content constituting the map information of the area and, for example, values of L1 to L3 are set in descending order of the priority. Hereinafter, the content level is also referred to as "Lv". One or more contents belong to each content level, and are statically defined as, for example, a lane center line as Lv1 content, a road boundary line and a curvature/gradient as Lv2 content, and a sign/traffic light as Lv3 content. The map acquisition planning unit 13, the map acquisition execution unit 14, the situation recognition unit 17, and the control determination unit 18 hold the same information on the correspondence relationship between the content level and the belonging content.

If the acquisition of all the contents of Lv1 has been completed for a certain area, the automatic driving is possible, but the function of the automatic driving is limited. The limited function means, for example, a low traveling speed, an unsmooth operation of the steering wheel, and no lane change for overtaking. When all the contents of Lv1 and Lv2 have been acquired for a certain area, the limitation of the function is relaxed.

Each entry of the map acquisition scheduling information 200 is configured to be in the order of acquisition priority at the time of traveling in the area, and in this example, it is indicated that content is acquired with priority in the order of Lv1 content of the area A and Lv1 content of the area B. The map acquisition planning unit 13 determines an area to be acquired on the basis of the own vehicle position and the data size of the map information of each area. Further, the map acquisition planning unit 13 determines the acquisition priority in consideration of the arrival distance to the acquisition target area and the content level, and creates the map acquisition scheduling information 200.

Upon receiving the map acquisition scheduling information 200 from the map acquisition planning unit 13, the map acquisition execution unit 14 determines a simultaneous acquisition number in units of content determined on the basis of the communication quality information measured by the communication quality measurement unit 12. Then, the map acquisition execution unit 14 acquires map information from the map distribution center in units of content according to the map acquisition scheduling information 200, and stores the acquired map information in the map information buffer unit 16. The simultaneous acquisition number counts one or more pieces of content belonging to the same content level of the area corresponding to one entry of the map scheduling information as one unit. For example, when the simultaneous acquisition number is "2", and the map information is acquired according to the priority indicated by the map acquisition scheduling information 200 illustrated in FIG. 3, the map acquisition execution unit 14 simultaneously acquires the following two. That is, the map acquisition execution unit 14 simultaneously acquires the Lv1 content of the area A and the Lv1 content of the area B.

When the communication quality information changes to a good section during the acquisition of the map information, the map acquisition execution unit 14 newly and additionally starts the acquisition of the content. In a case where the communication quality information has changed to a defective section, the map acquisition execution unit 14 stops the acquisition of the content in progress. Further, the map acquisition execution unit 14 has a function of deleting map information of areas that have passed and become unnecessary among the map information stored in the map information buffer unit 16.

The own vehicle position estimation unit 15 calculates the position of the vehicle 1 using a GPS, a gyro, and an acceleration sensor mounted on the vehicle 1, and generates own position information indicating the position. Various formats can be used as the own position information as long as the own position information can specify the position, and the own position information is, for example, a combination of latitude and longitude. The own vehicle position estimation unit 15 periodically notifies the map acquisition planning unit 13 and the situation recognition unit 17 of the generated own position information.

The map information buffer unit 16 temporarily stores the map information acquired by the map acquisition execution unit 14. Therefore, the map information buffer unit 16 can also be referred to as a "storage unit". The map information stored in the map information buffer unit 16 is deleted by the map acquisition execution unit 14. The map information buffer unit 16 has a function of outputting the stored map information in accordance with a request from the situation recognition unit 17.

The situation recognition unit 17 acquires the map information stored in the map information buffer unit 16 on the basis of the own position information generated by the own vehicle position estimation unit 15. In addition, the situation recognition unit 17 integrates the own position information, the sensor information generated by the sensor 31, and the travel route information output by the navigation device, periodically calculates information regarding the surrounding situation including the state of the vehicle 1, and notifies the control determination unit 18 of the information as the situation recognition information. Further, when notifying the control determination unit 18 of the situation recognition information, the situation recognition unit 17 simultaneously notifies the content level of the map information used to calculate the situation recognition information.

For example, the situation recognition unit 17 specifies an area where the vehicle 1 travels next, and refers to the map information buffer unit 16 to confirm content of the area where the vehicle 1 travels next. At this time, the situation recognition unit 17 determines the content level of the area as level 1 in a case where all the Lv1 contents of the area are collected, determines the content level as level 2 in a case where all the Lv1 and Lv2 contents are collected, and determines the content level as level 3 in a case where all the Lv1 to Lv3 contents are collected.

The control determination unit 18 uses the situation recognition information received from the situation recognition unit 17 to determine a control method for safely traveling on the route, and notifies the control operation unit 34 of the control method as operation information. In addition, the control method determined at this time is functionally limited by the content level notified from the situation recognition unit 17 and the control policy table 300 held by the control determination unit 18.

(Control Policy Table 300)

FIG. 4 is a diagram illustrating an example of a control policy table 300. The control policy table 300 includes a content level 301, a control policy ID 302, and a control policy 303. The content level 301 is a content level of the map information used to calculate the situation recognition information notified from the situation recognition unit 17. The content level 301 is the same type of information as the content level 202 in the map acquisition scheduling information 200.

The control policy 302 is an ID of a control policy corresponding to the notified content level 301. The control policy 303 indicates functional restriction of the set automatic driving function. In this example, the control policy is different for each content level, but a plurality of content levels may correspond to one control policy. By associating the content level with the control policy, it is possible to determine the automatic driving function to be executed according to the held content at the time of traveling the area. That is, even in a state where all the contents in the area cannot be used, the automatic driving function that can be performed with the held contents can be continued by providing the functional restriction. The control policy used by the control determination unit 18 is notified to the control policy notification unit 32.

The navigation device 30 has a function of calculating travel route information from the current location of the vehicle 1 to the destination based on the input of the destination information by the user, and outputting the information to the automatic driving control device 10. In the present embodiment, as described later, automatic driving is executed according to a travel route calculated by navigation device 30.

The sensor 31 is, for example, a camera, a laser radar, or the like, and has a function of periodically generating surrounding information of the vehicle 1 and outputting the surrounding information to the automatic driving control device 10. The control policy notification unit 32 includes at least one of a liquid crystal display and a speaker. The control policy notification unit 32 notifies the user of the control policy being executed based on the control policy information notified from the control determination unit 18. When the control policy notification unit 32 notifies the user of the scheduled switching to the manual driving, it is necessary to execute the manual driving by the user's own operation.

The manual control unit 33 notifies the control operation unit 34 of operation information based on the manual operation of steering, accelerator, brake, or the like by the user. The control operation unit 34 executes an operation of the automatic driving vehicle based on the operation information received from the control determination unit 18 and the manual control unit 33.

The map distribution center 2 includes a map information database 20, a map distribution planning unit 21, a map distribution processing unit 22, and a center communication unit 23. The map distribution center 2 may include a plurality of devices, or may include one computer, for example, a server device. The map information database 20 is a database formed in a nonvolatile storage device, for example, a hard disk drive. The map information database 20 is a database in which map information used by the vehicle 1 for automatic driving travel control is stored for each predetermined geographical area, in other words, for each area. The map information stored in units of areas includes a plurality of contents such as a lane center line, a curvature, and a feature. The information stored in the map information database 20 is updated as appropriate.

Each geographical area includes one or more pieces of content. In the present embodiment, information obtained by combining information of all pieces of content included in one geographical area is also referred to as "map information". Further, since each piece of content is a part of the map information, the content can also be referred to as "partial data".

The map distribution planning unit 21 and the map distribution processing unit 22 are realized by a CPU, a ROM, and a RAM (not illustrated) provided in the map distribution center 2. Specifically, the map distribution planning unit 21 and the map distribution processing unit 22 realizes these functions by the CPU developing a program stored in the ROM into the RAM and executing the program. However, at least one of the map distribution planning unit 21 and the map distribution processing unit 22 may be realized by an FPGA or an ASIC instead of a combination of a CPU, a ROM, and a RAM. Further, at least one of the map distribution planning unit 21 and the map distribution processing unit 22 may be realized by a combination of different configurations, for example, a CPU, a ROM, a RAM, and an FPGA instead of the combination of a CPU, a ROM, and a RAM.

Upon receiving the travel route information from the map acquisition planning unit 13 of the automatic driving control device 10, the map distribution planning unit 21 calculates the above-described map distribution plan information 100 using the map information database 20 and the received travel route information. Then, the map distribution planning unit 21 outputs the calculated map distribution plan information 100 to the map acquisition planning unit 13.

Upon receiving a map information acquisition request designating an area and content from the map acquisition execution unit 14 of the vehicle 1, the map distribution processing unit 22 performs the following processing. That is, the map distribution processing unit 22 acquires the designated content from the map information database 20 in the area corresponding to the designated area ID, and distributes the content to the vehicle 1. The center communication unit 23 is a communication module that transmits and receives data to and from the vehicle 1. The center communication unit 23 communicates with the vehicle 1 via the network 3 and the wireless base station 4.

(Content Level Correspondence Table 400)

FIG. 5 is a diagram illustrating an example of a content level correspondence table 400. The content level correspondence table 400 includes a content level 401 and a content ID 402. The content level 301 is the same kind of information as the content level 202 of the map acquisition scheduling information 200 and the content level 301 of the control policy table 300. The content ID 402 is an ID given to each specific attribute related to the road. For example, in the content ID 402, "M" represents "lane center line", and "N" represents "road boundary line".

(Processing of Map Acquisition Planning Unit)

Figure 6:
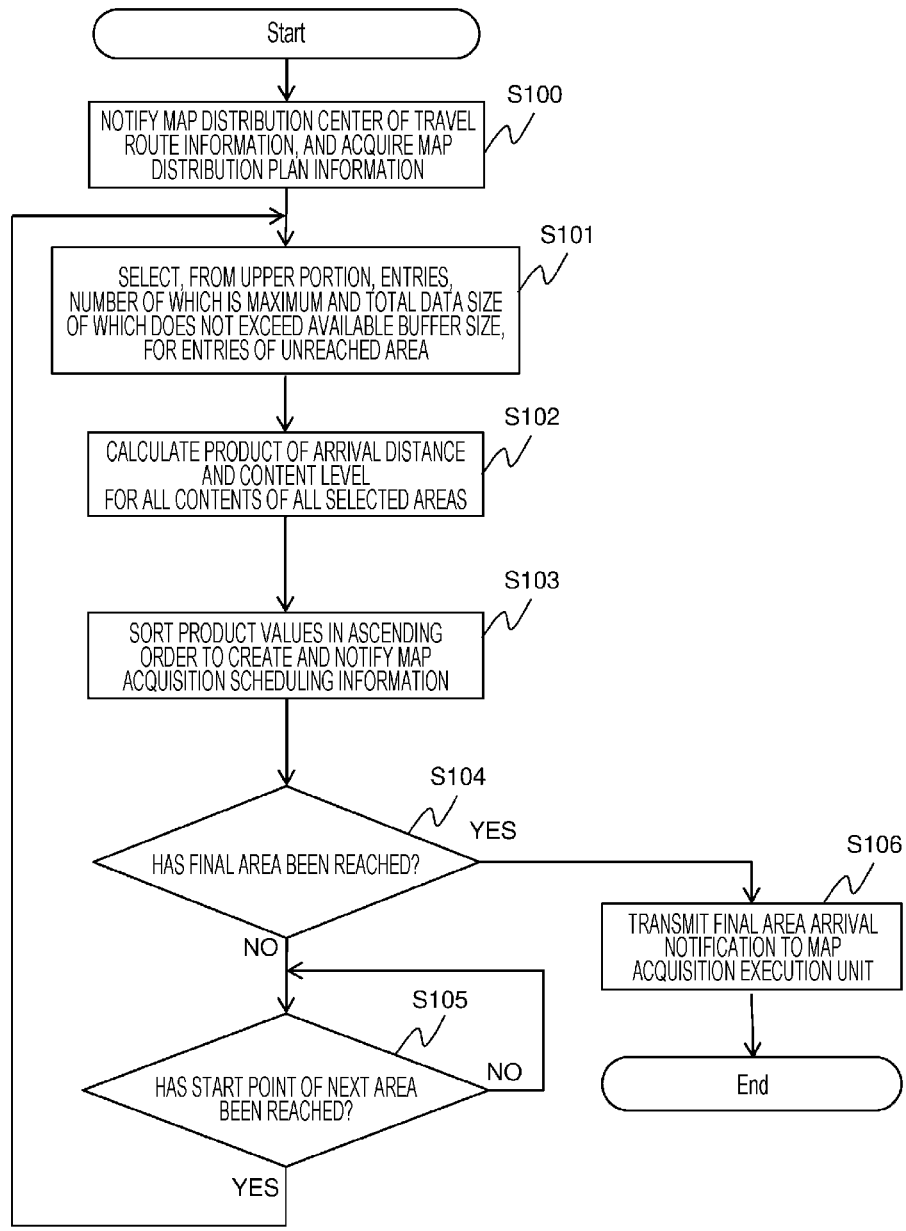
FIG. 6 is a flowchart illustrating processing of a map acquisition planning unit.

FIG. 6 is a flowchart illustrating processing of the map acquisition planning unit 13. Specifically, FIG. 6 illustrates processing that starts when the map acquisition planning unit 13 receives travel route information from the navigation device 30, and processing that creates the map acquisition scheduling information 200 and notifies the map acquisition execution unit 14 of the map acquisition scheduling information 200.

First, the map acquisition planning unit 13 notifies the map distribution center 2 of the travel route information received from the navigation device 30, and acquires the map distribution plan information 100 calculated by the map distribution center 2 (S100). Next, the map acquisition planning unit 13 refers to the area ID 101 and the data size 102 of the acquired map distribution plan information 100, and selects the maximum number of the entries of which the total data size does not exceed the available buffer size for the entry of the unreached area in the order of traveling on the route from the current location (S101). However, in the present embodiment, in the case of the first selection after receiving the map distribution plan information 100, the entry of the current location is also included. For example, the map acquisition planning unit 13 selects the area A and the area B since the total of the three areas A to C is 450 kB in a case where the map distribution plan information 100 is the first selection and the available buffer size is 400 kB as illustrated in FIG. 2.

Next, the map acquisition planning unit 13 calculates an arrival distance, which is a distance from the current location to all the areas selected in S101, and calculates a product of the arrival distance and the content level (S102). At this time, the arrival distance is obtained by referring to the column of the route travel distance 104 of the map distribution plan information 100 and performing summing as necessary. Next, the map acquisition planning unit 13 sorts the products in ascending order of the product values calculated in S102, creates map acquisition scheduling information 200, and notifies the map acquisition execution unit 14 of the map acquisition scheduling information (S103).

Next, the map acquisition planning unit 13 uses the own position information periodically received from the own vehicle position estimation unit 15 to determine whether the final area has been reached (S104). When determining that the final area has been reached, the map acquisition planning unit 13 transmits a final area arrival notification to the map acquisition execution unit 14, and ends the processing (S106). When determining that the final area has not been reached, the map acquisition planning unit 13 determines whether the start point of the next area has been reached (S105). When determining that the start point of the next area has not been reached yet, the map acquisition planning unit 13 stays at S105, and when determining that the start point of the next area has been reached, the map acquisition planning unit returns to S101.

(Processing of Map Acquisition Execution Unit)

Figure 7:
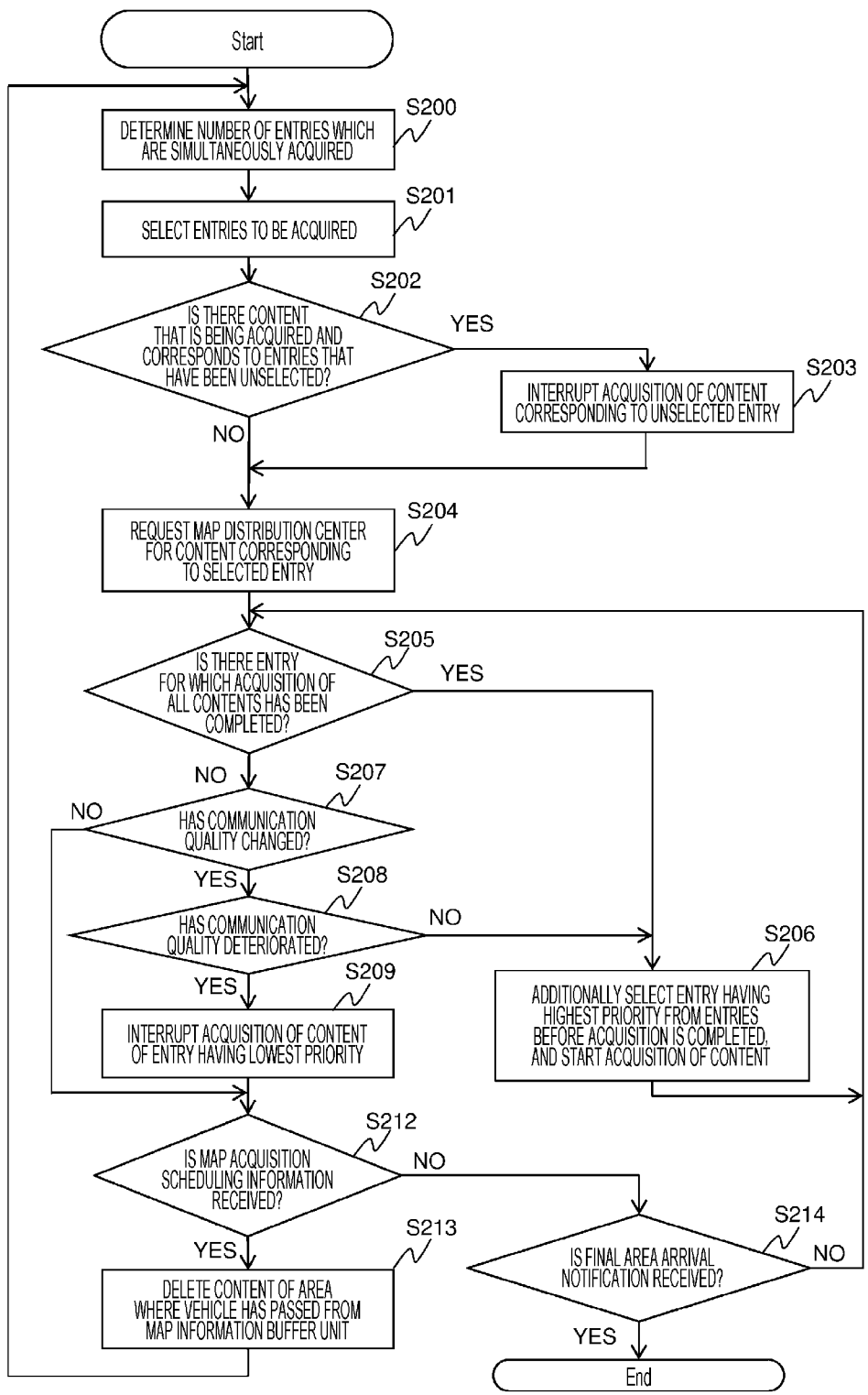
FIG. 7 is a flowchart illustrating processing of a map acquisition execution unit.

FIG. 7 is a flowchart illustrating processing of the map acquisition execution unit 14. Specifically, FIG. 7 illustrates map information acquisition processing that is processing started when the map acquisition execution unit 14 receives the map acquisition scheduling information 200 from the map acquisition planning unit 13.

First, the map acquisition execution unit 14 determines the simultaneous acquisition number as described above according to the latest communication quality information received from the communication quality measurement unit 12 (S200). Next, the map acquisition execution unit 14 selects entries in descending order of priority indicated by the map acquisition scheduling information 200 (S201).

Next, the map acquisition execution unit 14 determines whether there is an entry which has been previously selected in the processing of the previous S201 by the selection of S201 but has been unselected in the current selection of S201 (S202). When the map acquisition execution unit 14 determines that there is an unselected entry (S202: YES), the acquisition of the content corresponding to the unselected entry is interrupted, and the processing proceeds to S204 (S203). For example, S203 is executed in a case where the communication quality is deteriorated and the simultaneous acquisition number is decreased, or in a case where the user enters the area corresponding to the content before the acquisition of the content is completed. When the map acquisition execution unit 14 determines that there is no unselected entry (S202: NO), the process directly proceeds to S204.

In S204, the map acquisition execution unit 14 requests the map distribution center 2 for the content corresponding to the entry selected in S201, starts the acquisition, and proceeds to S205. Note that, in a case where the selected entry is an entry corresponding to the content that is already being acquired, the acquisition of the content is continued as it is. The content acquired by the map acquisition execution unit 14 is stored in the map information buffer unit 16. The content request to the map distribution center 2 described above is executed, for example, by notifying the content ID 402 and the area ID 201 belonging to the content level 401 to be acquired according to the content level correspondence table 400.

In S205, the map acquisition execution unit 14 determines whether there is an entry for which acquisition of all contents has been completed among the entries selected in S201. When it is determined that there is an entry for which acquisition of all contents has been completed, the process proceeds to S206, and when it is determined that there is no entry for which acquisition of all contents has been completed, the process proceeds to S207. In S206, the map acquisition execution unit 14 additionally selects the entry having the highest priority from the entries before the acquisition is completed, starts the acquisition of the corresponding content, and returns to S205.

In S207, the map acquisition execution unit 14 receives the communication quality information from the communication quality measurement unit 12, and determines whether the communication quality has changed from the state in S200. The map acquisition execution unit 14 proceeds to S208 when determining that the communication quality has changed, and proceeds to S212 when determining that the communication quality has not changed. When determining that the communication quality has improved in S208, the map acquisition execution unit 14 proceeds to S206 (S208: YES), and when determining that the communication quality has deteriorated, the map acquisition execution unit proceeds to S209 (S208: NO). In S209, the map acquisition execution unit 14 interrupts the acquisition of the content corresponding to the entry having the lowest priority among the contents being acquired, and proceeds to S212.

In S212, the map acquisition execution unit 14 determines whether new map acquisition scheduling information 200 has been received from the map acquisition planning unit 13. When determining that the new map acquisition scheduling information 200 is received, the map acquisition execution unit 14 deletes the content of the area through which the vehicle passes from the map information buffer unit 16 (S213), and returns to S200. When determining that the new map acquisition scheduling information 200 has not been received, the map acquisition execution unit 14 determines whether the vehicle 1 has reached the final area and a final area arrival notification has been received from the map acquisition execution unit 14 (S214). When determining that the final area arrival notification has been received, the map acquisition execution unit 14 terminates the processing illustrated in FIG. 7, and when determining that the final area arrival notification has not been received, the map acquisition execution unit returns to S205. Note that the final area arrival notification is a notification transmitted by the map acquisition planning unit 13 in S106 of FIG. 6.

(Operation Example)

Figure 8:
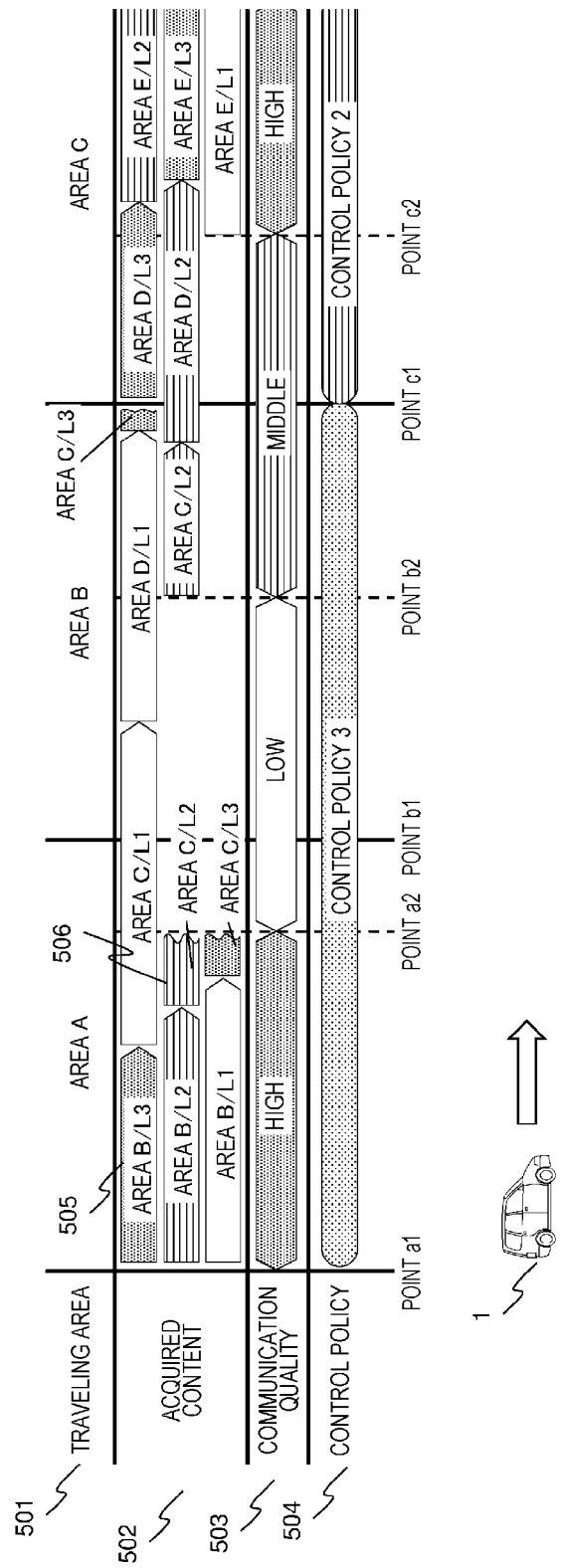
FIG. 8 is a diagram illustrating an operation example.

FIGS. 8 and 9A to 9C are diagrams illustrating an operation example in the present embodiment. Specifically, FIG. 8 illustrates notification processing executed by the map acquisition planning unit 13 and map information acquisition processing executed by the map acquisition execution unit 14. Each of FIGS. 9A to 9C is the map acquisition scheduling information 200 calculated at each of points a1 to c1 described later.

FIG. 8 illustrates a progress of content acquisition when the vehicle 1 travels in the order of A, B, and C, a change in communication quality, and a change in a control policy used for automatic driving control. As illustrated in the lower part of FIG. 8, points where the areas A, B, and C start are referred to as points a1, b1, and c1, respectively. Each of the points a2, b2, and c2 indicates a position ahead of each of the points a1, b1, and c1 along the travel route.

The items of reference numerals 501 to 504 illustrated in FIG. 8 will be described. The traveling area 501 indicates an area where the vehicle 1 is traveling, and the vehicle 1 travels in the right direction of the drawing. The acquired content 502 indicates the content acquisition progress, for example, the content acquisition progress 505 indicates that the content at content level 3 in the area B is acquired, and the left end of the figure indicates the acquisition start point and the right end indicates the completion point. Further, a rightmost wavy line denoted by reference numeral 506 indicates that the acquisition has been interrupted. The communication quality 503 indicates the communication quality at the point.

The control policy 504 indicates a control policy used for automatic driving control at the point. As the control policy here, according to the control policy table 300, the control policy 3 is used when all the content levels 1 to 3 of the area have been acquired, the control policy 2 is used when the content levels 1 and 2 have been acquired, and the control policy 1 is used when only the content level 1 has been acquired.

The operation illustrated in FIG. 8 will be described. First, the vehicle 1 has reached the point a1 which is the start point of the area A in a state where all pieces of map information of the area A up to the content levels 1 to 3 have been acquired. In this case, while the vehicle travels in the area A, the vehicle automatically travels in a plurality of lanes at a maximum speed of 100 km/h using the control policy 3. When the map acquisition execution unit 14 receives map acquisition scheduling information 600*a* at the point a1, the map acquisition execution unit 14 determines that the simultaneous acquisition number is 3 because the communication quality is "high". Then, the map acquisition execution unit 14 selects three entries from the top of the map acquisition scheduling information 600*a*, and starts acquisition of the content levels 1 to 3 of the area B.

Then, when the map acquisition execution unit 14 completes the reception of all the contents belonging to the content level, an upper entry of the unacquired map acquisition scheduling information 600*a* is selected and acquisition is started. When the communication quality changes from high to low at the point a2, the map acquisition execution unit 14 changes the simultaneous acquisition number from 3 to 1, and interrupts the acquisition of the content corresponding to the entries of the two pieces of map scheduling information from the entry with low priority. That is, the acquisition of the content belonging to content levels 2 and 3 in area C is interrupted.

Next, the vehicle 1 reaches the point b1 which is the start point of the area B. At this point of time, since the content of the area B held by the vehicle 1 is the content corresponding to the content levels 1 to 3, "3" is continuously used as the control policy. In addition, the map acquisition execution unit 14 receives map acquisition scheduling information 600*b* illustrated in FIG. 9B from the map acquisition planning unit 13. Then, the map acquisition execution unit 14 similarly determines the simultaneous acquisition number as "1" from the communication quality information, and selects the entry of the content level 1 of the area C that is the highest level of the map acquisition scheduling information 600*b*.

Here, the content corresponding to the entry is being acquired, and the acquisition of the content is continued. Then, when the acquisition of the content is completed, the map acquisition execution unit 14 acquires the content corresponding to the content level 1 of the area D indicated by the next entry. When the vehicle further moves and the communication quality is improved from low to medium at the point b2, the map acquisition execution unit 14 changes the simultaneous acquisition number to 2 and additionally starts acquisition of the content corresponding to the content level 2 of the area C.

Then, the point c1 which is the start point of the area C is reached. At this point of time, since the content of the area C held by the vehicle 1 is the content corresponding to the content levels 1 and 2, the control policy to be used is "2", and the restriction of the automatic driving function to be executed is changed. Further, the map acquisition execution unit 14 receives map acquisition scheduling information 600*c* from the map acquisition planning unit 13.

Then, the map acquisition execution unit 14 similarly determines the simultaneous acquisition number as "2" from the communication quality information, and selects two from the upper entries of the map acquisition scheduling information 600*c*. Then, the map acquisition execution unit 14 continues the acquisition of the content corresponding to the content level 2 of the area D that is being acquired, and starts the acquisition of the content corresponding to the content level 3 of the area D. On the other hand, the acquisition of the content corresponding to the content level 3 in the area C that is being acquired is interrupted because the corresponding entry is not selected. When the vehicle further moves and the communication quality changes from medium to high at the point c2, the map acquisition execution unit 14 changes the simultaneous acquisition number to 3 and additionally starts acquisition of the content corresponding to the content level 1 of the area E.

According to the first embodiment, the following operational effects are obtained.

(1) The automatic driving control device 10 which is an electronic control device is mounted on the vehicle 1 and executes automatic driving control using a plurality of pieces of map information. Each piece of map information corresponds to a predetermined geographical area, and includes one or more pieces of partial data which are information of a predetermined attribute related to a road of the predetermined geographical area. The automatic driving control device 10 includes the map information buffer unit 16 that is a storage unit in which one or more pieces of map information are stored, the situation recognition unit 17 that is a specification unit that specifies map information corresponding to a traveling position of the vehicle 1, and the control determination unit 18 that determines a control method of the vehicle 1 at the traveling position of the vehicle 1 according to partial data included in the map information specified by the situation recognition unit 17. Therefore, the automatic driving control device 10 can select one of the control policies according to the amount of information on the traveling area to realize the automatic driving. In other words, even when the content related to the traveling area is insufficient, the automatic driving control device 10 can perform the automatic driving according to the acquired content of the traveling area, that is, the held information.

(2) The automatic driving control device 10 includes the in-vehicle communication unit 11 that acquires partial data from the map distribution center 2 existing outside the vehicle by wireless communication. Since the map information of the area necessary for the automatic driving travel is used while being acquired from the map distribution center 2 via the communication network during traveling, it is possible to obtain the cost advantage by reducing the storage capacity mounted on the vehicle 1. In addition, by acquiring the latest map information each time traveling is performed, it is possible to guarantee that the latest map information is used. Further, even if the content related to the traveling area is insufficient due to a problem such as the state of the communication network, the automatic driving according to the held information can be performed.

(3) The map acquisition planning unit 13 determines priority of partial data acquisition on the basis of a distance from a current position during traveling to an arbitrary geographical area and a type of partial data corresponding to the geographical area, and the map acquisition execution unit 14 acquires map information in accordance with the priority determined by the map acquisition planning unit 13. Note that the acquisition priority is represented as a description position in the map acquisition scheduling information 200. That is, the highest priority in the map acquisition scheduling information 200 is indicated.

(4) The map acquisition execution unit 14 determines the simultaneous acquisition number of pieces of partial data based on the communication quality information in the geographical area during traveling (S200 in FIG. 7), and acquires map information based on the simultaneous acquisition number. Therefore, the map information can be efficiently acquired according to the communication quality.

(5) The predetermined attribute related to the road includes at least one of a lane center line, a road boundary line, and a traffic light.

The automatic driving system S includes the electronic control device 10 mounted on the vehicle 1 and the map distribution center 2 that is a server that communicates with the electronic control device 10 via wireless communication. The electronic control device 10 includes the in-vehicle communication unit 11 that transmits, to the map distribution center 2, a travel route that is information on a route on which the vehicle 1 will travel from now on and receives the map distribution plan information 100 that is information on partial data related to the travel route, the map information buffer unit 16, the situation recognition unit 17, and the control determination unit 18. The map distribution center 2 includes the map information database 20 including a data size of information of a predetermined attribute regarding a road for each geographical area and information of a route for each geographical area, and the map distribution planning unit 21 that creates map distribution plan information on the basis of a travel route received from the electronic control device and the map information database 20.

(First Modification)

In the present embodiment, the map acquisition execution unit 14 holds a content level correspondence table 400, and notifies the area ID and the content ID to the map distribution center 2 to request the map acquisition. However, the map distribution center 2 may hold the content level correspondence table 400, and the map acquisition execution unit 14 may issue the map acquisition request by notifying the map distribution center 2 of the area ID and the content level.

(Second Modification)

Further, in the present example, the simultaneous acquisition number is determined using the communication quality information measured by the communication quality measurement unit 12, but for example, the automatic driving control device 10 may hold a communication quality map indicating the communication quality with respect to the position created by the administrator of the wireless communication system, refer to the communication quality map according to the own position, and acquire the communication quality information.

(Third Modification)

In the first embodiment described above, the map distribution center 2 creates the map distribution plan information 100 and distributes content. However, the creation of the map distribution plan information 100 and the distribution of the content may be realized by different hardware, or the hardware may be installed in different places.

(Fourth Modification)

The map distribution planning unit 21 may have the function of the map acquisition planning unit 13 in the first embodiment described above, and the map acquisition scheduling information 200 may be distributed from the map distribution center 2. In this case, the automatic driving control device 10 transmits the own position information to the map distribution planning unit 21 of the map distribution center 2. Then, the map distribution planning unit 21 recognizes that the automatic driving vehicle has reached the start point of the area, creates the map acquisition scheduling information, and distributes the map acquisition scheduling information 200 to the automatic driving control device 10.

(Fifth Modification)

In the first embodiment described above, there are three content levels of Lv1 to Lv3. However, there may be at least two content levels, and there is no upper limit. In addition, at least one piece of content belonging to each content level may exist, and one piece of content may exist at each content level.

Second Embodiment

A second embodiment of an automatic driving system according to the present invention will be described with reference to FIG. 8. In the following description, the same components as those in the first embodiment are denoted by the same reference numerals, and differences will be mainly described. The points that are not particularly described are the same as in the first embodiment. The present embodiment is different from the first embodiment mainly in that an automatic driving control device does not acquire map data from the map distribution center 2 via wireless communication and operates using only map data stored in advance in the automatic driving control device.

Figure 10:
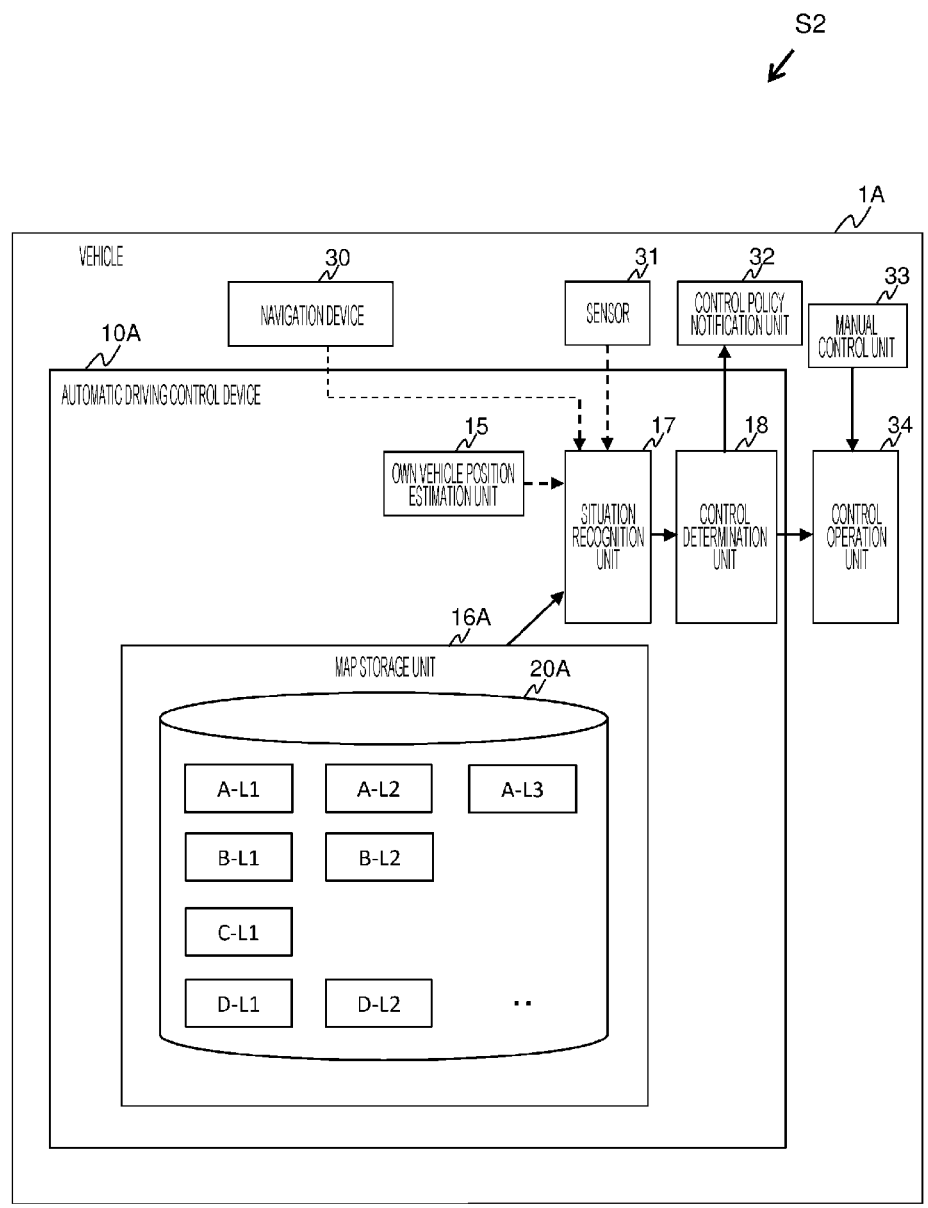
FIG. 10 is a configuration diagram of an automatic driving system in a second embodiment.

FIG. 10 is a configuration diagram of an automatic driving system S2. The automatic driving system S2 includes a vehicle LA. The vehicle LA includes an automatic driving control device 10A, a navigation device 30, a sensor 31, a control policy notification unit 32, a manual control unit 33, and a control operation unit 34. The automatic driving control device 10A includes the own vehicle position estimation unit 15, a map storage unit 16A, the situation recognition unit 17, and the control determination unit 18. That is, in the vehicle LA, the in-vehicle communication unit 11, the communication quality measurement unit 12, the map acquisition planning unit 13, and the map acquisition execution unit 14 are deleted from the configuration of the vehicle 1 in the first embodiment. In addition, the vehicle LA includes the map storage unit 16A instead of the map information buffer unit 16.

The map storage unit 16A stores a map information database 20A. In the present embodiment, the map information database 20A stores the content at levels 1 to 3 in the area A, the content at level 1 to 2 in the area B, the content at level 1 in the area C, the content at level 1 to 2 in the area D, and the like.

In the present embodiment, the situation recognition unit 17 acquires the map information stored in the map storage unit 16A on the basis of the own position information generated by the own vehicle position estimation unit 15. That is, the situation recognition unit 17 acquires map information from the map information buffer unit 16 in the first embodiment, but acquires map information from the map information buffer unit 16 in the present embodiment. The operation of the control determination unit 18 is the same as that of the first embodiment. For example, when the content stored in the map storage unit 16A is as illustrated in FIG. 10, the control determination unit 18 uses the control policy "3" in a case of traveling in the area A, the control policy "2" in a case of traveling in the area B, and the control policy "1" in a case of traveling in the area C.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

In each of the above-described embodiments and modifications, the program of the automatic driving control device 10 is stored in the ROM (not illustrated), but the program may be stored in a non-volatile storage area. In addition, the automatic driving control device 10 may include an input/output interface (not illustrated), and a program may be read from another device via a medium that can be used by the input/output interface and the automatic driving control device 10 when necessary. Here, the medium refers to, for example, a storage medium detachable from the input/output interface, or a communication medium, that is, a wired, wireless, or optical network, or a carrier wave or a digital signal propagating through the network. Some or all of the functions implemented by the program may be implemented by a hardware circuit or an FPGA.

The above-described embodiments and modifications may be combined with each other. Various embodiments and modifications have been described, but the present invention is not limited to these contents. Other aspects which are conceivable within a scope of technical ideas of the present invention may be made within the scope of the present invention.

The disclosure of the following basic priority applications is incorporated herein by reference.

Japanese Patent Application No. 2019-105637 (filed on Jun. 5, 2019)

REFERENCE SIGNS LIST 1 vehicle
2 map distribution center
10 automatic driving control device
11 in-vehicle communication unit
12 communication quality measurement unit
13 map acquisition planning unit
14 map acquisition execution unit
15 own vehicle position estimation unit
16 map information buffer unit
17 situation recognition unit
18 control determination unit
20 map information database
21 map distribution planning unit
22 map distribution processing unit
30 navigation device
32 control policy notification unit
33 manual control unit
34 control operation unit
100 map distribution plan information
200 map acquisition scheduling information
300 control policy table
400 content level correspondence table

The invention claimed is:

1. An electronic control device that is mounted on a vehicle and executes automatic driving control using a plurality of pieces of map information,
wherein each piece of the map information includes one or more pieces of partial data corresponding to a predetermined geographical area and being information of a predetermined attribute related to a road of the predetermined geographical area,
the electronic control device comprising:
a processor in communication with the electronic control device, the processor comprising:
a storage circuit that stores one or more pieces of the map information;
a specification circuit that determines
a respective map information from among the plurality of pieces of map information corresponding to a traveling position of the vehicle, the traveling position comprising a current position of the vehicle, and
a content level of the respective map information; and
a control circuit that determines a control method of the automatic driving control of the vehicle at the traveling position of the vehicle according to the partial data included in the map information specified by the specification circuit,
wherein
a simultaneous acquisition number of the pieces of partial data is determined based on communication quality information in the predetermined geographical area during traveling, and the map information is acquired based on the simultaneous acquisition number,
the content level of the respective map information is based upon the communication quality information, and
the electronic control device executes the automatic driving control based upon an association of the content level with the control method.

2. The electronic control device according to claim 1, further comprising:
a communication circuit that acquires the partial data from outside the vehicle by wireless communication.

3. The electronic control device according to claim 1, wherein
a priority of acquiring partial data is determined according to a distance from the current position of the vehicle during traveling to the predetermined geographical area and a type of the partial data corresponding to the predetermined geographical area, and the map information is acquired according to the priority.

4. The electronic control device according to claim 1, wherein
the predetermined attribute related to the road includes at least one of a lane center line, a road boundary line, and a traffic light.

5. A control method executed by an electronic control device that is mounted on a vehicle and executes automatic driving control using a plurality of pieces of map information,
wherein each piece of the map information includes one or more pieces of partial data corresponding to a predetermined geographical area and being information of a predetermined attribute related to a road of the predetermined geographical area, and
wherein the electronic control device includes a storage unit in which one or more pieces of the map information are stored,
the control method comprising:
determining a respective map information from among the plurality of pieces of map information corresponding to a traveling position of the vehicle, the traveling position comprising a current position of the vehicle, and
a content level of the respective map information; and
determining a control policy of the automatic driving control of the vehicle at the traveling position of the vehicle according to the partial data included in the specified map information,
wherein
a simultaneous acquisition number of the pieces of partial data is determined based on communication quality information in the predetermined geographical area during traveling, and the map information is acquired based on the simultaneous acquisition number,
the content level of the respective map information is based upon the communication quality information, and
the electronic control device executes the automatic driving control based upon an association of the content level with the control policy.

6. The control method according to claim 5, further comprising:
acquiring the partial data from outside the vehicle by wireless communication.

7. The control method according to claim 5, wherein
a priority of acquiring partial data is determined according to a distance from the current position of the vehicle during traveling to the predetermined geographical area and a type of the partial data corresponding to the predetermined geographical area, and the map information is acquired according to the priority.

8. The control method according to claim 5, wherein
the predetermined attribute related to the road includes at least one of a lane center line, a road boundary line, and a traffic light.

9. An automatic driving system comprising:
an electronic control device that is mounted on a vehicle and executes automatic driving control using a plurality of pieces of map information; and
a server that communicates with the electronic control device via wireless communication,
wherein each piece of the map information includes one or more pieces of partial data corresponding to a predetermined geographical area and being information of a predetermined attribute related to a road of the predetermined geographical area,
wherein the electronic control device includes:
a processor in communication with the electronic control device, the processor comprising:
an in-vehicle communication circuit that transmits, to the server, a travel route that is information on a route on which the vehicle will travel, and receives map distribution plan information that is information on the partial data related to the travel route;
a storage circuit that stores one or more pieces of the map information;
a map acquisition execution circuit that acquires the partial data from outside the vehicle based on the map distribution plan information and stores the partial data in the storage circuit;
a specification circuit that determines
a respective map information from among the plurality of pieces of map information corresponding to a traveling position of the vehicle, the traveling position comprising a current position of the vehicle, and
a content level of the respective map information; and
a control circuit that determines a control policy of the automatic driving control of the vehicle at the traveling position of the vehicle according to the partial data included in the map information specified by the specification circuit,
wherein
a simultaneous acquisition number of the pieces of partial data is determined based on communication quality information in the predetermined geographical area during traveling, and the map information is acquired based on the simultaneous acquisition number,
the content level of the respective map information is based upon the communication quality information, and
the electronic control device executes the automatic driving control based upon an association of the content level with the control policy, and
wherein the server includes:
a map information database that includes a data size of information of a predetermined attribute regarding the road of the predetermined geographical area and information of the route for the predetermined geographical area; and
a map distribution planning circuit that creates the map distribution plan information based on the travel route received from the electronic control device and the map information database.

* * * * *